May 9, 1967 F. A. SCHWERTZ 3,318,698
XEROPRINTING REPRODUCTION
Filed May 3, 1963 5 Sheets-Sheet 1

INVENTOR.
FREDERICK A. SCHWERTZ
BY
*Stanley B. Cole*
ATTORNEY

May 9, 1967 F. A. SCHWERTZ 3,318,698
XEROPRINTING REPRODUCTION
Filed May 3, 1963 5 Sheets-Sheet 4

INVENTOR.
FREDERICK A. SCHWERTZ
BY
*Stanley Z. Cole*
ATTORNEY

INVENTOR.
FREDERICK A. SCHWERTZ
BY
Stanley Z Pole
ATTORNEY

United States Patent Office 3,318,698
Patented May 9, 1967

3,318,698
XEROPRINTING REPRODUCTION
Frederick A. Schwertz, Pittsford, N.Y., assignor to Xerox Corporation, Rochester, N.Y., a corporation of New York
Filed May 3, 1963, Ser. No. 277,879
4 Claims. (Cl. 96—1.1)

This invention relates to xeroprinting and to a method and apparatus therefor.

Xerography was discovered by Chester F. Carlson in the 1930's. Essentially, the process involves the utilization of an electrostatic image created in response to light. In the process as described in U.S. 2,297,691 to C. F. Carlson, a layer of photoconductive insulating material is uniformly charged in the dark and a light pattern projected thereon to selectively dissipate the electrostatic charge. The result is to create on the photoconductive insulating layer a pattern of electrostatic charge corresponding to the areas of shadow of the light image projected thereon. This electrostatic charge pattern may then be developed, i.e., made visible, by contacting the surface with finely divided, electrostatically charged marking particles. The visible powder image may then be affixed to the photoconductive insulating surface, transferred to a suitable image support member such as paper or otherwise utilized as is well known to those skilled in the xerographic art.

As can be seen, the xerographic process is essentially a form of a photographic process requiring light for the formation of the electrostatic charge pattern. Various ingenious means have been devised to provide multiple copy without subsequent exposure of the xerographic plate. Such processes include dividing up the powder image in a succession of transfer steps to the paper support as disclosed, for example, in U.S. 2,812,709, or multiple developments and transfers of the pre-existing charge pattern combined with various process steps necessary to preserve the electrostatic image. These processes all have various inherent limitations. Thus, to divide up a single electrostatically adhering powder image by the multiple transfer method results in, at most, about fourteeen copies and often less. More important, the multiple copies are obtained at the loss of image density of the original.

The various processes based on multiple development and transfer of the electrostatic image require, first, of course, operation in the dark; second, controlling the electrostatic field at the transfer step so as to prevent charge transfer as well as powder transfer to the image support member; and third, while the photoconductive insulating material is an excellent insulator, it does lose charge even in the dark (a property termed "dark decay") and as the charge cannot be renewed without destroying the electrostatic image, dark decay limits the period of utilization of the electrostatic image. Thus, while a number of copies of reproduction of a single original may be produced in this manner, xerography has not generally been used in such a process.

Accordingly, Carlson, in U.S. 2,357,809 disclosed, for the first time, apparatus in a process whereby the principle of the electrostatic image development and transfer were utilized in a true mass-production printing process. A more advanced application of this invention (termed "xeroprinting") is described in Schaffert U.S. Patent 2,576,047. Two alternative means for xeroprinting were disclosed. In the first, the powder image on a xerographic plate was permanently fused or fixed to the photoconductive insulating surface thereby creating on the surface of the xerographic plate an electrically insulating, light-insensitive image pattern. On uniformly charging such a plate and then flooding it with light, the electrostatic charge will be retained only on the light-insensitive image areas and the photoconductive background was discharged by the light. Such a plate could be cycled in a rotary apparatus using only the xerographic steps of charging, uniform exposure to light, contact the electrostatically charged marking particles, and transfer of the developed image. While such a process had potentiality of a true printing or mass-production type of operation, in practice this potentiality has not been realized. Thus, photoconductive insulating materials, while possessing vastly superior physical properties to photographic emulsions, are far short of the requirements for physical performance imposed in a continuous printing operation.

Moreover, photoconductive insulating materials have tended, when continuously cycled, to build up a residual charge in the layer. This charge is termed "residual potential." After repetitive cycling, as is inherent in a printing operation, electrostatic contrast between light-insensistive image areas and the so-called light-sensitive image areas has often become less and less and in extreme cases, vanishes altogether.

Recently there has been discovered a novel form of xerography in which an electrostatic pattern is used for selective frosting in image configuration on a continuous deformable film or layer. Such a method is described in copending application, Ser. No. 193,277 filed May 8, 1962, now U.S. Patent 3,196,011 in the name of Gunther et al. and incorporated herein by reference. In accordance with the disclosure of the Gunther application, there is provided a xerographic imaging method that is adapted to reproduce continuous tone as well as line copy images as a frosted image pattern in the surface of the deformable layer.

Now in accordance with the instant invention, it has been discovered that when applying uniform charge to the surface of a deformable layer containing a frosted image, there is produced a differential charge on the surface of the layer. That is, the frosted areas accept a lower charge than the unfrosted areas in image configuration. In accordance with the invention it was found that this charge differential can be developed and the developed image transferred as is conventional in xerography. Since the pattern is retained with a relative degree of permanency, it lends itself to reuse any number of times. Such a pattern is ideally suited as a xeroprinting master, from which one or more copies can be made. Additionally, the master material may be erased, as will be understood, after a number of copies have been made. This provides a reuseable long-life master material. Accordingly, the invention provides a novel, inexpensive, yet highly accurate method of multiple-copy reproduction by providing a xeroprinting master which can be inexpensively prepared sufficiently in advance of intended use and stored or just prior to use for the reproduction of multiple copies.

Accordingly, it is the object of the invention to provide novel method and apparatus for the reproduction of copy.

It is a further object of the invention to provide a novel method and apparatus for the multiple reproduction of copy from a single optical exposure.

It is still a further object of the invention to provide a novel xeroprinting master for multiple-copy reproduction.

The various features, advantages, and limitations of the invention will become apparent from the following description and drawings in which:

FIG. 1a through c is a partially schematic representation of steps preliminary to forming a frost image in accordance with the prior art;

FIG. 2a through e is a partially schematic representation of alternative steps preliminary to forming a frost image in accordance with the prior art;

Figure 1A:
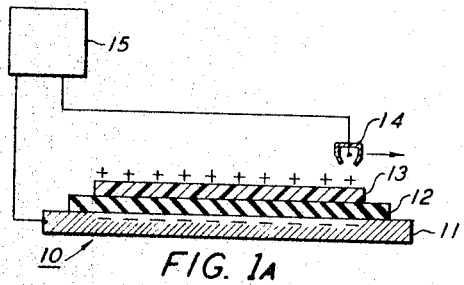
Figure 2A:
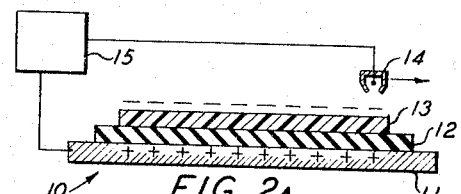
Figure 2B:
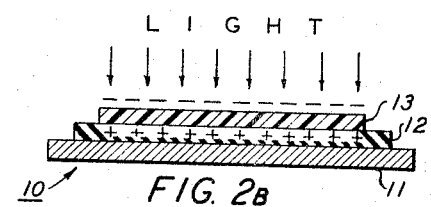
Figure 2C:
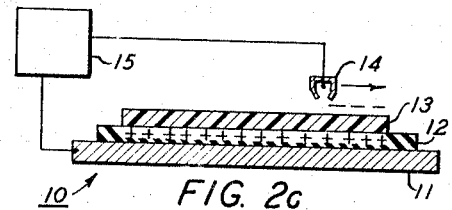

FIG. 1 illustrates schematically a sequence of steps preliminary to the preparation of forming a frost image. Thus FIG. 1a shows charging of a xerographic plate 10 comprising support member 11 (which may be omitted in some cases), a layer of photoconductive insulating material 12 and a deformable layer 13. Support member 11 is generally a material which is relatively conductive when compared to the photoconducting insulating layer 12. It may thus comprise in accordance with the conventional xerographic usage, such materials as aluminum, brass, or other materials, including paper, glass with a transparent or other conductive coating or like known layers. Support layer 11 may comprise a non-conductor as is taught in the art in which case some of the manipulations described herein are modified according to the knowledge of the art. Layer 12 may comprise any of the photoconductive insulating materials known to be useful in the art of xerography. Such material preferably including such layers as selenium, sulphur or anthracene and other organic photoconductors as well as dispersions of photoconductive pigments such as zinc oxide and various resins or other electrically insultating binder materials. Layer 12 is generally characterized as being a good electrical insulator capable of maintaining a surface charge in the dark, but becoming substantially more conductive when illuminated by visible light X-rays, or other forms of activating radiation. Thus, it may also comprise an insulating layer which becomes more conductive upon undergoing a photochemical reaction such as those described in U.S. Patent 3,081,165. For illustrative purposes only, layer 12 may be considered to be a layer of vitreous selenium about 20 microns in thickness. Vitreous selenium layers are more fully discussed in Bixby U.S. Patent 2,970,906. Layers 11 and 12 should preferably have smooth surfaces.

Layer 13 comprises a thin layer of material which is generally normal solid and electrically insulating but which may be temporarily softened by the application of heat, solvent vapors, or the like. Layer 13 may be opaque when viewed by reflection only, otherwise it should be and normally is transparent. In a further embodiment, it may comprise a layer of highly viscous insulating material. For illustrative purposes only, layer 13 may be considered a layer of thermoplastic resin of approximately 2 to about 5 microns in thickness. Where a transparent support member is employed, rear exposure may be utilized as will be later described and for which layer 13 need not be transparent. Layer 13 should also have a uniform thickness and a smooth surface.

Electrostatic charging of plate 10 is effected as shown in FIG. 1a, by moving it relative to a corona charging device 14 which is connected to a high voltage power supply 15. Corona charging devices are well known in the xerographic art and are described, for example, in U.S. Patents 2,777,957 and 2,836,725. Other methods of applying a uniform potential onto insulating surfaces are known and may be employed. In accordance with conventional xerographic practice, a potential of up to about 800 volts, generally positive, may be applied to plate 10. The total potential difference applied is divided between layers 12 and 13 inversely as a ratio of their capacitances per unit area. Most of the potential will generally appear across photoconductive insulating layer 12 because, even though it has a higher dielectric constant than layer 13, it is sufficiently thicker so as to have a lower capacitance per unit area.

Figure 1B:
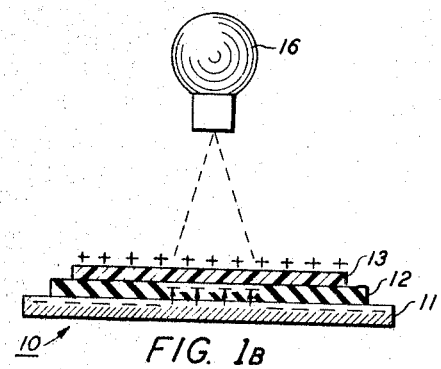
Figure 2D:
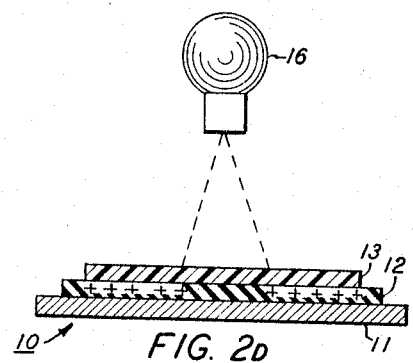
Figure 1C:
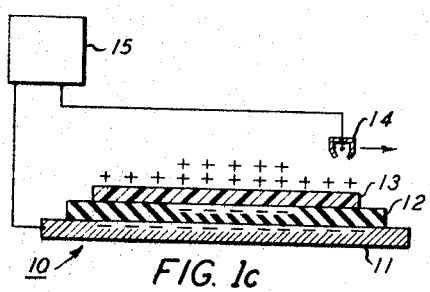
Figure 2E:
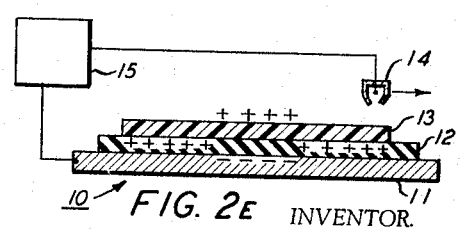

The next step is exposure of the plate 10 to a pattern of light and shadow and is illustrated in FIG. 1b. Where support member 11 is transparent, exposure may be made through member 11. Exposure may be made by means of a photographic enlarger 16, as illustrated, or in a camera, or by contact exposure, or by other means. Where struck by light, photoconductive insulating layer 12 becomes electrically conductive and permits charges bounded at the interface between layer 12 and support member 11 to migrate to the interface of layer 12 and layer 13. Such charge migration does not lower the electrical field in layer 13 but does locally lower the potential at the surface of layer 13.

The next step, as shown in FIG. 1c is to again charge the surface of layer 13 to a uniform potential, which may be the same potential as was applied in connection with FIG. 1a. The areas of previous exposure, and thus of internal charge migration on the surface of layer 13 accept additional charges indicated in the figure. While the surface of layer 13 is once again an equipotential surface, the electric field is now greatly increased in regions of layer 13 corresponding to illuminated areas and the electrostatic energy in these areas is likewise increased, while unexposed areas retain only the original charge. If desired, plate 10 may again be exposed and registered with the same pattern of light and shadow and again be recharged with uniform potential. This produces a somewhat higher field in layer 13 in exposed areas and by repeating this process several times, it is possible to create in the exposed areas of layer 13 an electrical field virtually equal to the entire potential applied at the surface thereon divided by the thickness of layer 13. Nevertheless, a single exposure step is all that is ordinarily required or desired.

Figure 3:
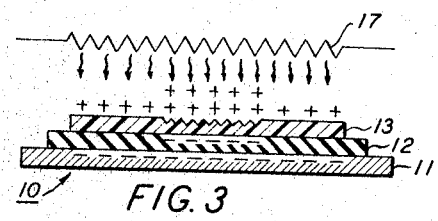
FIGS. 3 and 4 are schematic representations of further steps in preparing a frost image common to the methods of both FIGS. 1 and 2.

The next step is to temporarily soften deformable layer 13 so that it becomes physically altered by the mechanical forces associated with the electrostatic pattern thereon. Any softening method may be employed provided it does not increase electrical conductivity of layer 13 sufficiently to cause the electrical charges thereon to leak away or become dissipated. The most common methods of softening are to expose layer 13 to an atmosphere of solvent vapors for materials of layer 13 or to heat it. The latter method is illustrated in FIG. 3 wherein plate 10 is shown positioned beneath the heating element 17. As the material of layer 13 is softened, it is enabled to flow in response to the electrostatic forces acting upon it. As shown in FIG. 3, the surface of layer 13 in areas of high field develops a microscopically uneven surface which can also be described as rippled, stippled, reticulated, wrinkled, or frosted. This local deformation, referred to in this specification and the claims as "frosting," causes layer 13 to take on a milky appearance in proportion to the amount of illumination received in different areas and thus represents a form of continuous tone reproduction. This localized deformation occurs, it is believed, because the electrostatically charged surface of layer 13 is inherently unstable, i.e. the layer is in a lower energy condition when in the frosted or roughened condition than when smooth. Likewise, by effecting a high field in the non-illuminated areas as opposed to the illuminated areas, frosting can be effected in the former as will be understood.

Figure 4:
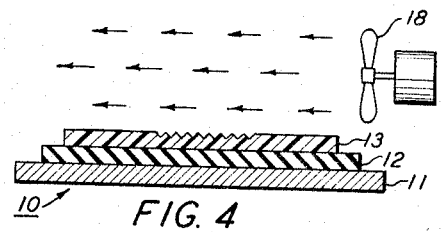

The next processing step, as illustrated in FIG. 4, is to reharden layer 13 thereby freezing the frost surface pattern in place. This can be accomplished, for example, by removing the source of heat, solvent vapor or the like used to soften deformable layer 13, and blowing across the surface a quantity of relatively cool air as by a fan 18. It is generally desired to reharden layer 13 as soon as the frost appears. Heat softening generally permits quicker hardening. Excessive softening or excessively prolonged softening of layer 13 is also to be avoided because it may cause a loss of the image pattern. Deformation of layer 13 is caused by electrostatic forces exerted by charges at the surface of the layer. Excessive softening of the layer may permit these charges to flow through the layer thereby destroying the image-producing forces or at least the frost-producing forces. Certain materials with sharp melting points, such as certain waxes, are therefore not properly suited for layer 13 because it is impractical to bring them to a viscous as opposed to watery conditions.

Thereafter, the frosted image may be utilized in accordance with the invention which will be considered in detail after first considering the embodiment of FIG. 2 providing one of the alternate methods for the forming of the frost image. Thus, referring to FIG. 2, plate 10 may be the same as that described in connection with FIG. 1, and the first step is to electrostatically charge the plate 10 as shown in FIG. 2a. By this method of preliminary preparation, the initial charge is illustratively of negative polarity, but it is understood that all polarities shown may be replaced by their opposites. The next step is to expose the plate to light, such as ordinary room illumination. This causes photoconductive insulating layer 12 to become electrically conductive and causes the induced positive charges previously at the interface between layers 12 and 13 as shown in FIG. 2b. Following this, plate 10 is returned to darkness and is electrostatically charged with just sufficient positive charge to substantially neutralize the negative charge previously on the surface of layer 13. This second charging is illustrated in FIG. 2c and may be performed by the same apparatus shown in FIG. 2a with appropriate adjustments. The next step in FIG. 2d is to expose plate 10 to a pattern of light and shadow thereby dissipating in illuminated areas the positive charges trapped at the interface between layers 12 and 13. The next step, shown in FIG. 2e, is to again apply a positive charge to plate 10, thereby bringing its surface to a uniform positive potential, typically on the order of several hundred volts. There is thus formed in layer 13 an electrical field pattern corresponding to the pattern of light and shadow. Further processing to convert the electric field pattern into a frosted surface can be carried out exactly as described further, in connections with FIGS. 3 and 4 described above. As should be apparent in connection with this method of preparation, the steps illustrated through FIG. 2c places a uniform charge at the interface of photoconductor 12 and layer 13 and other techniques to accomplish such charging as through induction or the like may be employed. Thus whether formed in the manner described above or by such other means as is known in the art including a frost formation in a deformable layer supported by a conductor rather than a photoconductor and imaged by a TESI discharge as, for example, disclosed in U.S. Patents 2,825,814, 2,919,967, 3,015,304, and 3,064,259 a frosted image of copy is prepared preliminary to carrying out the further steps of the invention as will now be described.

Figure 5:
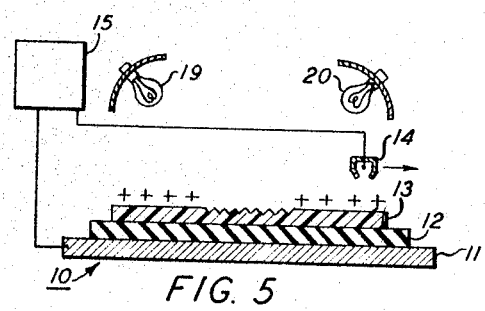
FIGS. 5, 6 and 7 are partially schematic representations of steps for processing the frosted image in accordance with a preferred method of the invention.

Now in accordance with the invention the frosted image thus formed can be utilized as a master from which prints and subsequent reprints can be made in substantial quantities. Thus it has been found that when applying a uniform charge to such an image formation as illustrated in FIG. 5, as by corona generator 14 in the presence of illumination supplied by lamps 19 and 20, there will be retained on the surface of layer 13 a charge differential distinguishing the frosted from the unfrosted areas. Specifically, it has been found that the frosted areas have a charge retention that is usually lower and frequently substantially lower than the unfrosted areas. It was found further that the charge differential lends itself to development with an electroscopic powder to produce a powder image formation that can subsequently be processed further in accordance with the xerographic art.

As shown therefore in FIG. 5, the layer of deformable material 13 is first charged to produce a charge acceptance that is higher in the unfrosted versus the frosted areas. Where supported on a photoconductor, charging should be performed in the presence of or prior to illumination to render the photoconductor conductive permitting charges to leak away in the frost areas. Illumination is unnecessary where a conductive element comprises the base support. The differential was found to vary to some degree, depending on factors such as choice of materials employed in forming the frost image, etc. At the same time, it was found that there was no apparent correlation between the charge differential and print quality although generally it was found that the frost images of higher potential (or voltage) ultimately produced the higher contrast reproduction.

Figure 6:
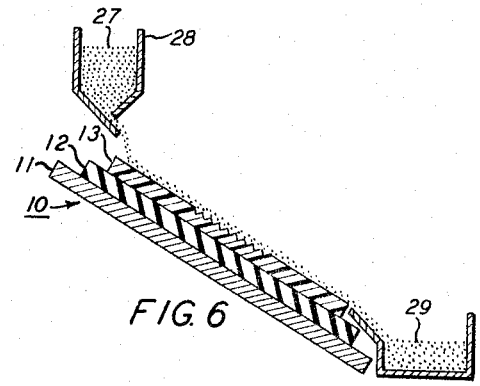

After charging in the manner of FIG. 5, an electroscopic powder is presented to the surface of the deformable layer, as in FIG. 6 to develop the charge pattern. Any form of electroscopic developer as is known in the xerographic art can be used including cascade, brush, powder cloud, magnetic, liquid, etc., whereby the powder deposits on the surface predominantly in the unfrosted areas. For convenience of illustration, FIG. 6 shows using a cascade method of development in which a two-component type of developer 27 comprising a mixture of finely divided electroscopic toner particles and relatively larger carrier particles to which the toner particles are adherent. This form of developer as disclosed, for example, in Wise patent U.S. 2,618,552, is released from a hopper 28 to pass over and in contact with the charged surface. By pouring the developer material over the xerographic plate in this manner, it has been found that toner particles preferentially adhere to the plate in the non-frosted areas. Excess developer passes into a receiving bin 29. With a developer triboelectrically charged opposite to that utilized above, it becomes possible to develop the frosted as opposed to the unfrosted areas.

Figure 7:
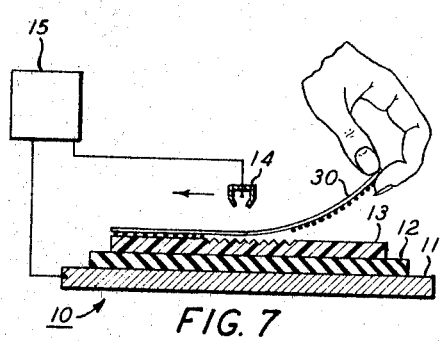

Following development, the developed image is transferred to a secondary support surface such as paper 30 by any suitable means known in the xerographic art. Again for purposes of illustration, electrostatic transfer is employed, as shown in FIG. 7, in which a charge of appropriate polarity is applied to the back of the paper when positioned over the developed image and then the paper is removed. The transferred image may then be affixed to the paper to render the reproduction permanent.

Thereafter, the unfrosted areas can be redeveloped by repeating the charging and developing steps followed by transfer any suitable number of times without destroying the frosted image. On exhausting the requirement for further copy, the frosted image can be erased or even selectively erased and the plate reprocessed to form a new or partially new frost pattern. This can be done by employing the same procedure which may be used for softening layer 13 initially. Thus layer 13 may again be heated or exposed to solvent vapors, preferably in the presence of light when a photoconductor is present. Light causes dissipation of charges in photoconductive insulating layer 12 while extensive softening of layer 13 permits diffusion and neutralization of charges thereon and permits surface tensions to restore the surface of layer 13 to a smooth condition. It may also be noted that many materials useable for layer 13, while nominally solid, have sufficient flow properties in their normal state that frosted images formed thereon in accordance with the foregoing procedures will smooth out and disappear of themselves in several hours or less. Refrigeration of the image block will prolong its preservation. Also materials such as Staybelite Ester 10 tends to retain the image more permanently on aging while others can be chemically or physically treated to effect increased preservation.

With repetitive processing, it is particularly important that layer 13 be substantially free of dust particles prior to forming the frost images, as such particles can cause permanent distortions in layer 13.

The phenomena by which the invention is operable is not completely understood but can possibly be explained in different ways. Thus average charge potentials as measured by an electrometer are indicative of which materials when frosted are most likely to accept powder deposits in image configuration. At the same time, it is believed that the bulk resistivity of the material further contributes to its utility in the process and apparatus of the invention. Thus Staybelite Ester 10, which is a glycerol rosin ester manufactured by the Hercules Powder Company, has a relatively high resistivity, so that it retains a high potential in the hills of the image areas. The valleys, on the other hand, are relatively thin and accordingly exhibit higher decay rate to produce a potential gradient that is readily developable. Thus as measured by an electrometer, which is only able to detect average voltage over a relatively wide area, the readings over frosted and non-frosted areas were practically identical; nevertheless strong voltage difference exist on a micro-scale over the frosted areas thus producing a high quality powder image of fine resolution in these areas.

Staybelite Ester 10, after frosting and as measured by the electrometer showed only a 10-volt differential less in the frosted areas than unfrosted areas both on initial application and after one minute at which time the unfrosted area charge was reduced approximately 60 to 70%. Similarly, Piccoumaron and Picco 75, which are respectively coumarone and indene products of the Pennsylvania Industrial Chemical Company, produced approximately 140- to 150-volt differentials yet formed powder image reproductions of lower density than Staybelite Ester 10. Attempts to understand the phenomena occurring in connection with the steps of this invention would tend to suggest inoperability as opposed to operability such that achievement of the latter is truly a surprising and unexpected result. That is, it appears that the peculiar and unexpected decay or breakdown as occurs in the charged frosted layer accomplished from a charge emitter supported equidistant from the frost surface would not occur but would produce uniform charge throughout. When charging a frosted layer, the distance from the emitter varies minutely in frost areas as compared to unfrosted areas. However, the frost areas are comprised of both hills and valleys and the average thickness is substantially equivalent to the average thickness of unfrosted areas since the valleys comprise an absence of material displaced into the hills in an amount to cause the frosted area to average out to the unfrosted areas. Thus the net effect would suggest that charging of frosted and unfrosted areas should produce an equipotential surface. Such a surface is not generally developable using conventional xerographic developing techniques, since development is dependent on field gradients across the surface being developed. The unexpected occurrence in accordance with this invention is that development does in fact take place and with good fidelity as is known in the art. Without intending to limit this invention to any particular mode of operation, it is believed that development becomes possible because charge gradients are created on the surface by means of charge dissipation through the thin sections in the frost areas. These gradients create the necessary fields to permit conventional xerographic development techniques to be employed to achieve a visible and transferrable image.

As has been mentioned above, differences in results have been noticed among different frostable material. For example, it is believed that a material which does not readily breakdown to allow charge flow through the valleys will not produce an adequate field variation on its surface to permit development. Similarly, if the layer is too thick even in the unfrosted area, the valley areas may be too thick to allow charge dissipation at the particular conventional levels being employed. This theoretical approach is also helpful to determine operability when on initial testing, it is not found to operate. Thus, where no charge difference tends to extend across the layer, a charge difference can be created by using a thinner layer or through a combination of these differences. Also, if it is found after charging that all areas of charge on the surface are dissipated, developable charge patterns can be created by using a thicker layer or higher field or a combination of these two. To date, this approach has been found beneficial in carrying out the instant invention.

Figure 8:
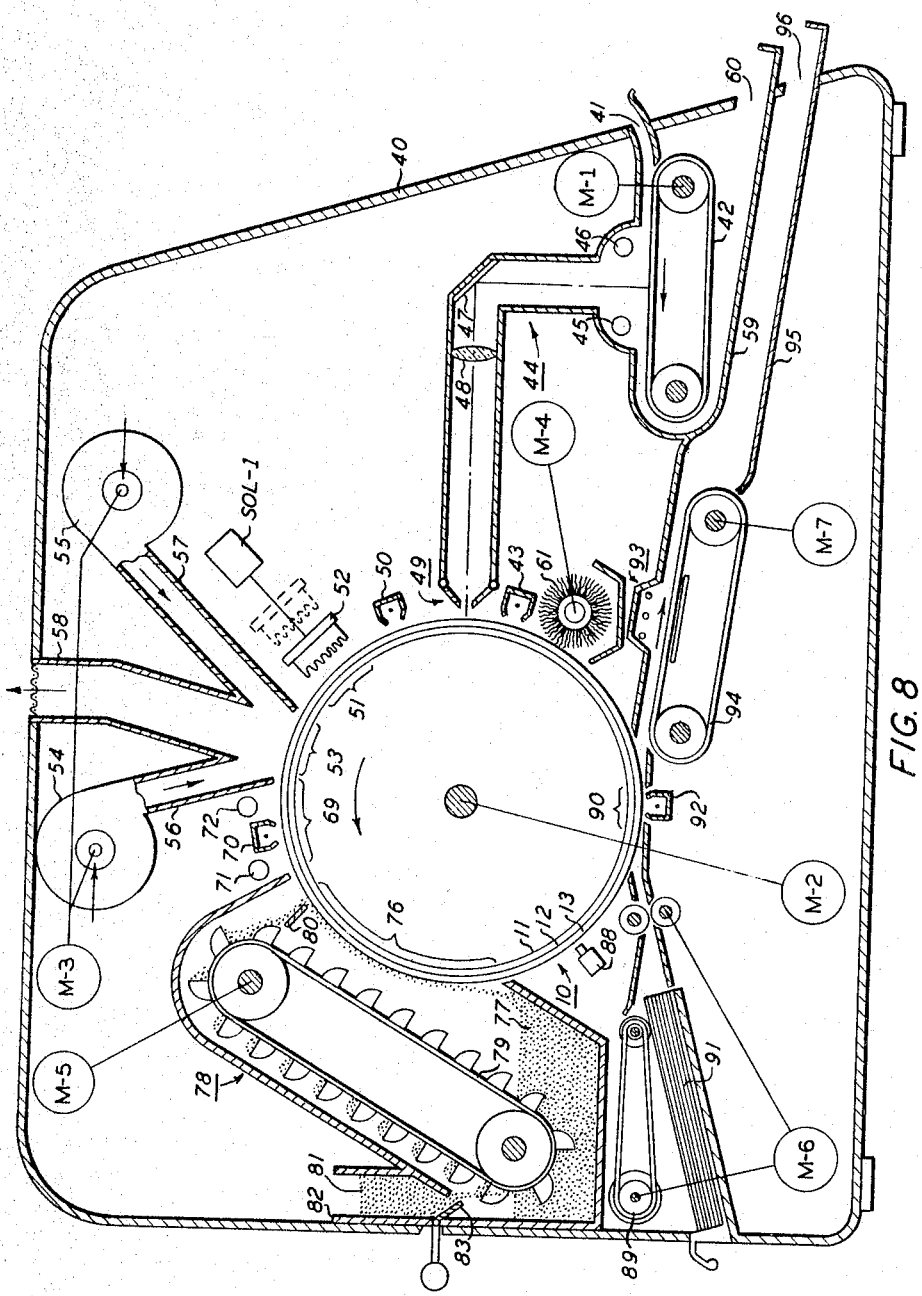
FIG. 8 is a schematic sectional view of an automatic apparatus embodying one form of the invention.
Figure 10:
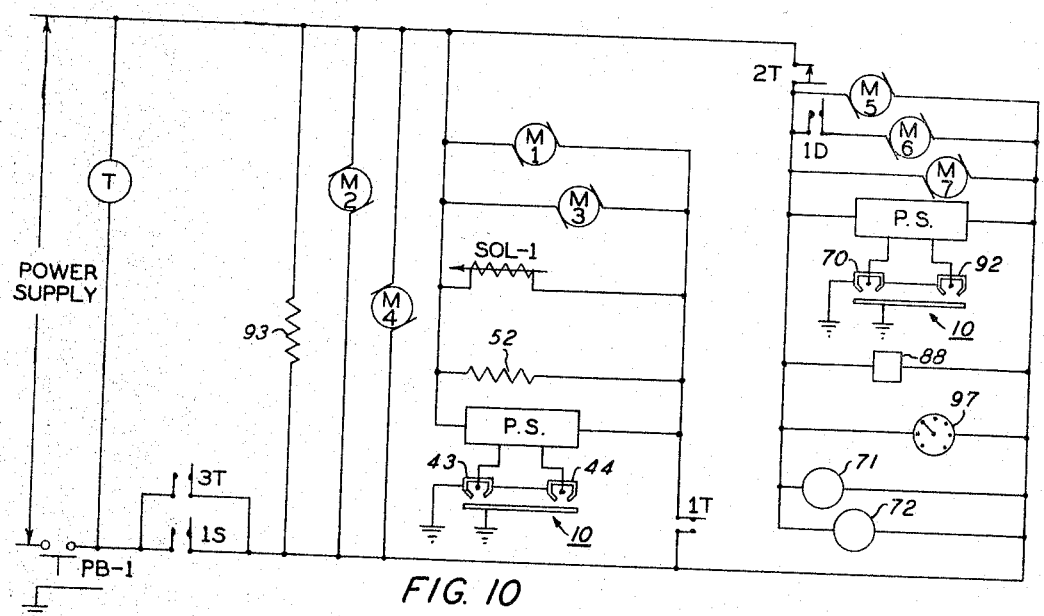
FIG. 10 is a simplified schematic electrical diagram in accordance with the embodiment of FIG. 8.

Referring now more particularly to FIGS. 8 and 10, there is shown a schematic sectional elevation and electrical diagram of an automatic apparatus largely embodying the method steps described above in connection with the above figures, excluding FIG. 2. As shown, the entire apparatus is contained within a light-tight exterior housing 40. Original copy to be reproduced is inserted through an opening 41 in the housing and comes to rest on a continuous and endless conveyor 42 being driven by a motor M-1.

The xerographic drum 10 includes a cylindrical member mounted in suitable bearings in the frame of the machine and is driven in a counterclockwise rotation by a motor M-2 at a constant rate that is proportional to the transport rate of the copy whereby the peripheral rate of the drum surface is identical to the rate of movement of the reflected light image. As above, the drum surface comprises a layer of deformable material 13 supported on a photoconductive layer 12 in turn supported on a conductive substrate 11.

In order first to form the frost image and to provide an initial cleaning and warmup as well as erasure of prior frost images, only certain of the components shown are initially operative. Thus initially as the drum rotates, the surface of layer 13 is continuously brushed clean by means of a vacuum-cleaned brush element 61 being driven by motor M-4 and is then uniformly charged by means of a corona generator 43. Simultaneously therewith, original copy on conveyor 42 is moved past the optical axis of a projection lens system 44 that includes copy illuminating means in the form of a pair of projection lamps 45 and 46. The image of the copy is reflected by a mirror 47 through an adjustable objective lens 48 and is then projected through a variable aperture assembly 49 onto the surface of the charged xerographic plate in the form of drum 10. As the drum surface continues its movement, it is again charged by corona generator 50 before passing next to the softening station, designated 51, whereat a heating unit 52 is closely spaced to the drum surface and energized in order to heat and soften the layer 13. The heater is positionable by means of selenoid SOL-1, whereby after softening the deformable layer, the heater is deenergized and removed to an ineffective position showed dashed.

After being softened, the drum surface passes a cooling station designated 53 whereat a pair of parallel blowers 54 and 55, being driven by a motor M-3, directs highly filtered air drawn into the apparatus from ambient surroundings, or optionally from a refrigerated air source, through respective ducts 56 and 57 to impinge against the drum surface and then exhaust through duct 58 to exterior of the housing. After passing the cooling station, the frost image has thus been formed on the drum surface to complete the initial stage of operation rendering inoperative the elements used to form the frost image which may then be further processed for forming multiple copies in a substantial quantity. At the same time, the original copy continues to advance on conveyor 42 until dumped onto a discharge chute 59 to slide out from the housing through an opening 60.

As can be seen by referring particularly to FIG. 10, on starting the apparatus by depressing PB-1, an adjustable preset timer T and motors M-2 and M-4 are immediately energized while normally open timer contacts 1T and 3T are closed and normally closed contact 2T is opened. The timer remains energized for a predetermined period being just sufficiently long to permit formation of the frost image. When the timer expires, each of its contacts resumes normal relation to initiate the second stage of the operation hereof.

The second stage of operation is initiated as contact 2T closes to continue the apparatus operative under control of a selector counter switch 97, set by the operator for any required number of copies. Charge is applied to the rotating drum surface at a charging station 69 by means of a corona generator 70 in the presence of or prior to intense illumination furnished by lamps 71 and 72. As the drum surface continues its movement, the charged surface then passes the developing station 76 at which a two-component developing material 77, which may be of the type disclosed in the Wise patent cited above, is cascaded over the drum surface by means of a developing apparatus 78. In the developing apparatus, the developing material is carried upwardly by conveyor 79 driven by means of a motor M-5 and is released onto a chute 80 wherefrom a cascade down over the drum surface to adhere to the charge gradient on the image surface. Toner component 81 of the developer consumed in developing is stored in dispenser 82 and is released in amounts controlled by means of an externally operable gate 83.

Thereafter, the powder image adhering on the deformable layer 13 passes through image transfer station 90 at which the powder image is electrostatically transferred to a support surface, such as cut sheets 91, that are fed in timed relation to the rotation of the drum and in registration to the frost image thereon by means of a drive 89 operated by motor M-6. An optical detector 88 having contacts 1D effects registration operation of motor M-6.

Transfer of the developed image to the sheet 91 is effected by means of another corona generating device 92 applying a charge of appropriate polarity against the backside of the sheet in contact with the drum. After transfer, the sheet is separated from the drum surface and is guided on a continuous endless conveyor mechanism 94 being driven by a motor M-7 through a suitable fusing device 93 wherein the transferred image is permanently affixed to the sheet surface. Thereafter, the reproduction thus formed descends onto a chute 95 to be discharged through an opening 96 exterior of the housing.

Switch 97 which is a conventional type multiple selector-counter switch, can be set to provide any number of cycles in which a corresponding number of reproductions are made from the frosted image after which switch contact 1S, that is closed when the switch becomes energized, opens to cause a complete shut-down of the machine. Thereafter a start-up, the machine may be operated as aforesaid for a period of a couple of minutes before inserting an original copy that is to be the subsequent subject matter of multiple reproduction. This, as before affords an opportunity for the deformable layer 13 to be erased of the previous image if any, and to achieve a smooth condition before subsequent formation is carried through.

Figure 9:
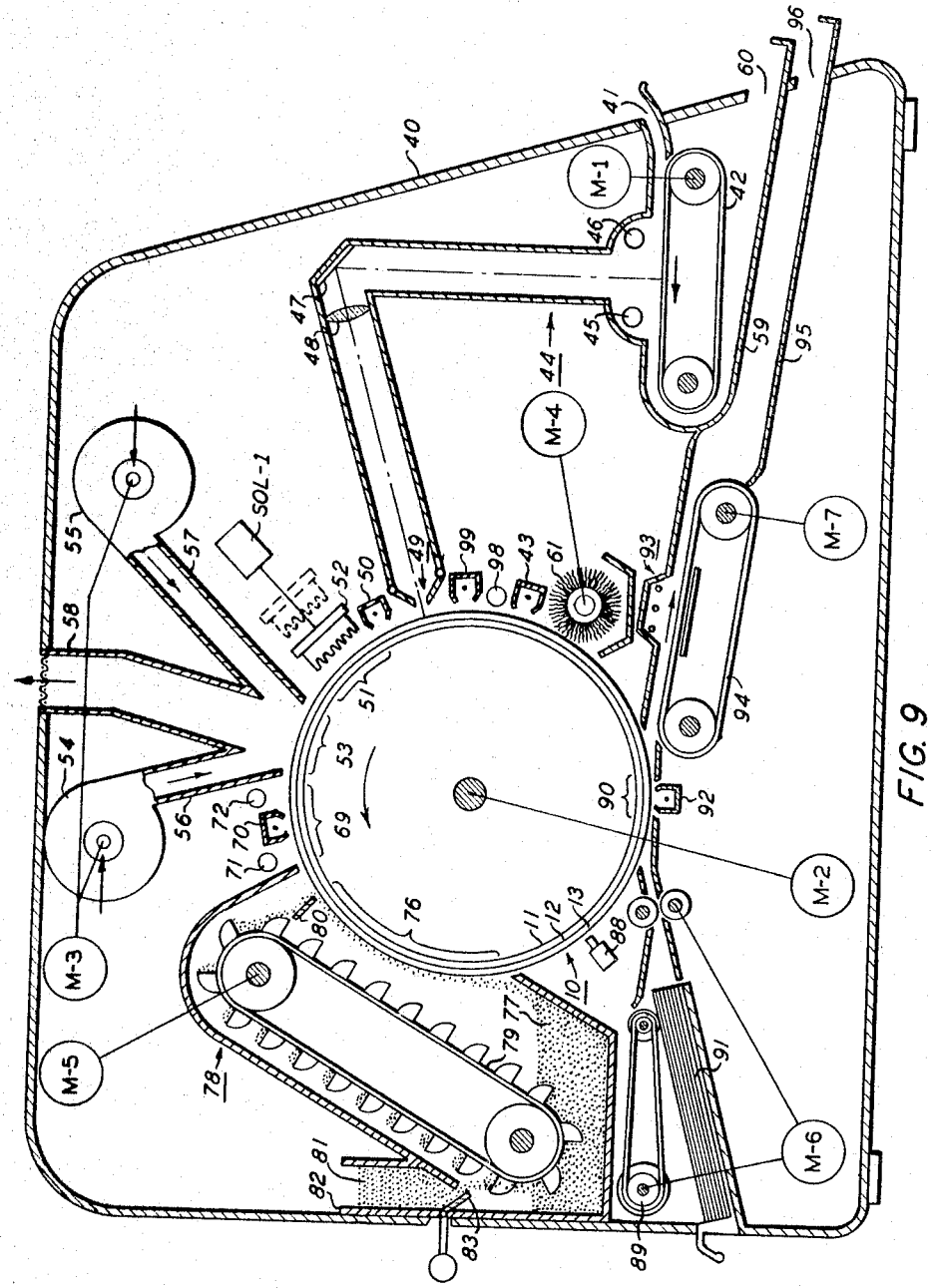
FIG. 9 is a schematic sectional view of an automatic apparatus embodying a second form of the invention.

Referring now to FIG. 9, the schematic illustration of an automatic apparatus embodying the process steps of FIGS. 2-7 in a similar manner as FIG. 8 embodies the initial step of FIG. 1. The apparatus is operable essentially the same as that of FIG. 8 except to comply with the steps described above in connection with FIG. 2. There is therefore imposed an illumination and charging step via a lamp 98 and a corona generator 99, respectively, intermediate the initial charging and exposure steps and operable concomitantly therewith.

By the above description, there is disclosed novel method and apparatus for the multiple reproduction of copy. In accordance with the invention, multiple copy can be reproduced rapidly and efficiently from a master pattern that is inexpensive and reusable virtually an endless number of times although obviously some materials will have longer usable life than others. Cleanliness is essential to prevent contamination from prematurely consuming the life of the deformable material. It is to be noted that the invention hereof is not in the formation of the frost image per se, but that any frost image formed by whatever means, yet having the requisite properties of a differential charge acceptance and development, may be employed herein.

While the generally preferred embodiments have been described, it is intended that such variations and material choices described in the above cited copending Gunther et al. application as can be utilized are to be encompassed herein.

Thus in accordance herewith, the insulating deformable layer need not be coated on a photoconductive insulating layer but may instead be coated on or at least used in conjunction with any electrically conductive surface. Suitable substrates include metal sheets and foils as well as glass or heat resistant plastics such as polyethylene terephthalate, with a conductive coating thereover. An electrostatic charge pattern may be formed on the surface of the deformable insulating material by various methods including bringing an image bearing xerographic plate into close contact with the deformable layer or by bringing an uncharged xerographic plate into close contact with the layer and applying a pattern of light and shadow to the xerographic plate while a potential is maintained between the xerographic plate and the conductive substrate of the deformable layer.

By another variation, the layer bearing the frosted image pattern can be stripped from the insulating photoconductive layer and placed on a conductive support for use herein or may be charged at each surface. In order to permit separation of the layers, it has been found preferable to wipe or otherwise provide a thin coating of a silicone oil or other light oil or electrically insulating low viscosity liquid that does not chemically react with the other materials used. One oil used was Dow Corning Type DC-200 with 20 centistoke viscosity. Such an oil layer reduces the tendency for air bubbles to form permitting a more uniform contact between the photoconductive layer and the strippable layer. Since the frostable materials such as thermoplastics and other deformable layers discussed in this disclosure cannot be stripped without dimensional distortion, it also is necessary in this embodiment to provide a separate support material in the strippable layer. Suitable support materials have been found to be transparent plastics such as polyvinyl chloride, polyvinyl acetate, and the like. A preferred material has been found to be polyethylene terephthalate due to its high dimensional strength in very thin layers.

By yet another variation, the photoconductive insulating layer of a xerographic plate may itself be made to assume a frosted pattern. This greatly simplifies the frosting process since it allows the elimination of the second charging step. Thus, the formation of a frost image directly on a photoconductor requires only the steps of charging, exposure and softening. In this case then, the photoconductor serves a dual purpose since it is used for both the formation of the electrostatic charge pattern and the frost pattern. By this method, frosting can be readily made to appear in the non-illuminated areas as opposed to the illuminated areas.

The invention can be carried out with any form of xerographic plate known to the art and which is useful for more conventional forms of xerography. Thus, the photoconductive insulating layer 12 may comprise vitreous selenium but it may also comprise other vitreous photoconductive insulating materials or other classes of photoconductive insulating materials such as dispersions of photoconductive pigments in film forming electrically insulating binders. Organic photoconductors, as described for example in Canadian Patent No. 568,707, are very suitable. A transparent support member may be employed and such a plate may be exposed through the back.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:
1. A method of copy reproduction comprising the steps of:
    (a) applying electrostatic charge to an image-bearing surface of a dielectric layer while supported on an electrically conductive substrate, wherein the image comprises a frosted light diffusing pattern in the form of microscopically formed alternating ridges and valleys in the otherwise smooth dielectric surface;
    (b) developing the electrostatic field on said charged surface by passing a quantity of electroscopic developer particles thereover to deposit thereon in accordance with electrostatic field gradients; and,
    (c) transferring the deposited powder from the dielectric surface to a secondary support surface.

2. The method according to claim 1 including the repetition of said steps at least once onto the same image previously formed.

3. A method of copy reproduction comprising the steps of:
    (a) applying electrostatic charge to an image-bearing surface of a dielectric layer supported on a photoconductive insulating material, wherein the image comprises a frosted light diffusing pattern in the form of microscopically formed alternating ridges and valleys in the otherwise smooth dielectric surface;
    (b) exposing actinic radiation to said photoconductor during or subsequent to said charging step to produce developable field gradients on the dielectric;
    (c) developing the electrostatic field on said charged surface by passing a quantity of electroscopic developer particles thereover to deposit thereon in accordance with electrostatic field gradients; and,
    (d) transferring the deposited powder from the dielectric surface to a secondary support surface.

4. A method of copy reproduction comprising the steps of:
    (a) forming a frosted light diffusing pattern of original copy in the form of microscopically formed alternating ridges and valleys in an otherwise smooth dielectric surface supported on a photoconductive insulating layer;
    (b) applying electrostatic charge to said image-bearing surface;
    (c) exposing actinic radiation to said photoconductor during or subsequent to said charging step to produce developable field gradients on the dielectric;
    (d) developing the electrostatic field on said charged surface by passing a quantity of electroscopic developer particles thereover to deposit thereon in accordance with electrostatic field gradients;
    (e) transferring the deposited powder from the dielectric surface to a secondary support surface to form a reproduction of the original copy thereon; and,
    (f) repeating at least once the steps of charging, developing, exposing and transfer to produce a multiple reproduction of the original copy.

References Cited by the Examiner
UNITED STATES PATENTS

| | | | |
|---|---|---|---|
| 2,618,552 | 11/1952 | Wise | 96—1 X |
| 2,857,290 | 10/1958 | Bolton | 96—1.4 |
| 2,970,906 | 2/1961 | Bixby | 96—1 |
| 3,041,167 | 6/1962 | Blakney et al. | 96—1 |
| 3,118,787 | 1/1964 | Katchman | 96—1 |
| 3,196,011 | 7/1965 | Gunther et al. | 96—1 |

FOREIGN PATENTS 1,325,193   3/1963   France.

NORMAN G. TORCHIN, *Primary Examiner.*

C. E. VAN HORN, *Assistant Examiner.*